May 3, 1927. Re. 16,608

S. C. MARKATOS

IRON SUPPORTING PLATE FOR HOT WATER BOILERS

Original Filed June 14, 1923

INVENTOR.
SPIROS C. MARKATOS

BY

Richard B. Owen

ATTORNEY.

Reissued May 3, 1927. Re. 16,608

UNITED STATES PATENT OFFICE.

SPIROS C. MARKATOS, OF NEW YORK, N. Y.

IRON-SUPPORTING PLATE FOR HOT-WATER BOILERS.

Original No. 1,497,730, dated June 17, 1924, Serial No. 645,475, filed June 14, 1923. Application for reissue filed December 15, 1925. Serial No. 75,659.

This invention relates to iron holders, supports or plates and more particularly to a novel and improved construction for mounting the same on the top of a conventional type of steam boiler such as is utilized in hat blocking, steaming and pressing machines.

The primary object of my invention is to provide a novel and improved yet simple connection for rigidly supporting a gas iron holder or plate on the top of a steam boiler so as to minimize space and take advantage of heat radiation at the top of said boiler so as to reduce gas consumption in maintaining the irons hot.

A further object of my invention is to provide a support and attachment for gas plates and the like which is extremely simple in construction, easily assembled, strong, durable, practical, highly efficient and otherwise capable of being manufactured at an extremely low cost whereby its commercial possibilities are greatly enhanced.

I accomplish the above objects and others which will be more readily understood when taken in connection with the accompanying drawings, showing a preferred embodiment of my invention, and wherein.

Figure 1:
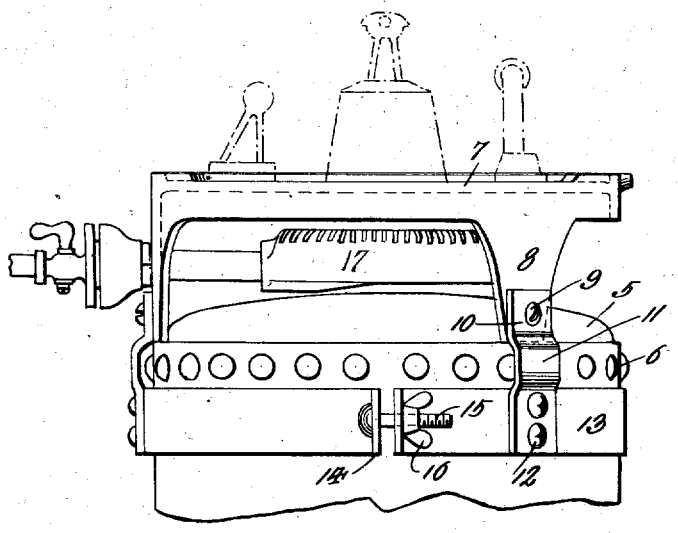
Figure 1 is a front elevation showing the gas plate or support secured to the top of a conventional type of hot water boiler.
Figure 2:
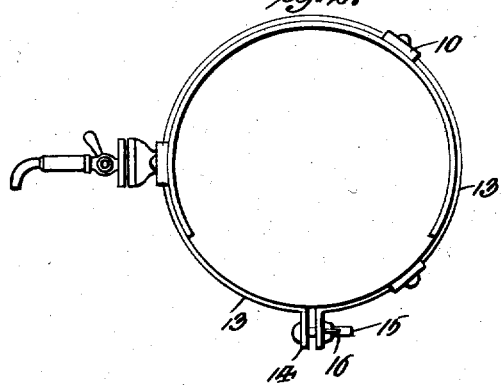
Figure 2 is a plan view showing the device.

Referring now to the drawings, wherein, like reference characters designate corresponding parts throughout the several views, 5 designates the top of the conventional type of hot water boiler and 6 designates the rivets securing the top thereon as is well understood. The conventional type of gas plate 7 having a plurality of depending legs or supports 8 are each secured by a screw or other fastening element 9 to a depending plate 10, said plate being bent outwardly as indicated at 11 in order to overlie the rivets at the top of the boiler. The plate 10 is preferably riveted as indicated at 12 to an annular clamping collar 13, the free ends of said collar 14 being secured by a bolt 15 and thumb nut 16 as clearly indicated by Figure 1 of the drawings. It is of course understood that a plate 10 is provided for each of the legs or supports 8 of the iron support or iron plate, which is usually provided with a conventional type of gas heating connection 17 beneath the same as shown by Figure 1 of the drawings.

It has been common practice to provide supports for irons on the sides of boilers but in each instance it is necessary to utilize gas to maintain the irons hot even when not in use. In pressing and blocking hats, particularly when utilizing steam boilers a certain amount of hot water is always maintained in the top of the boiler. I propose therefore, to utilize any heat radiation from the hot water in the top of said boiler by mounting the gas plate 7 thereon so that the irons may be maintained comparatively hot at all times without necessitating the use of gas. In so far as I am aware, gas plates of this character have never been mounted on the top of steam boilers for this purpose and a material having in gas consumption is effected by so mounting the plate as above described. It will be thus seen that the plate can be rigidly secured to the top of a boiler by placing the legs 8 so as to rest on the top of the band or connection between the body and end of the boiler and disposing the clamping collar 13 directly beneath the band. The entire plate and the clamping collar 13 may be constructed and sold as a unit for attachment to the hot water boiler in the manner above indicated and of course may be easily removed therefrom without in any way affecting the boiler.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. An attachment of the class described in combination with a hot water boiler and an iron holder, a plurality of plates attached to said holder, a split clamping band connected to said plates and encircling the boiler, and means for securing the ends of said clamping band to each other, thereby tightening the band about the body portion of said boiler.

2. An attachment of the class described in combination with a hot water boiler and the legs of an iron holder, a plate attached to each of the legs of the holder and bent to overlie the top portion of the boiler, a split clamping band riveted to the lower end of each of the plates and encircling the boiler and means for fastening the ends of the said band to each other, thereby tightening the band about the boiler.

3. An attachment of the class described, in combination with a hot water boiler and the legs of an iron holder, a plate secured to each of the legs of the holder, said plates being bent outwardly to overlie the riveted top portion of the boiler, a wide clamping band riveted to the inner sides of the plates, and a bolt and thumb nut for rigidly clamping the ends of the band to each other thereby tightening the band about the body of the boiler.

4. The combination with a boiler and an iron holder including depending legs seated upon the top of the boiler and spacing the top of the holder from the top of the boiler, of a clamping device carried by the depending legs for detachable gripping contact with the boiler for holding the holder against displacement.

5. In combination, a vertical steam boiler, a hot plate, means attaching said plate to the boiler in vertical spaced parallel relation with the top of the boiler, and a burner arranged in the space between the hot plate and the boiler.

SPIROS C. MARKATOS.